(12) United States Patent
Iyer et al.

(10) Patent No.: US 8,317,928 B1
(45) Date of Patent: Nov. 27, 2012

(54) LIGNIN PRODUCTION FROM LIGNOCELLULOSIC BIOMASS

(75) Inventors: Krishan V. Iyer, Philadelphia, PA (US);
Michel A. Simard, Berwyn, PA (US);
Kiran Kadam, Golden, CO (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

(21) Appl. No.: 13/464,453

(22) Filed: May 4, 2012

Related U.S. Application Data

(60) Provisional application No. 61/482,425, filed on May 4, 2011.

(51) Int. Cl.
*C13B 20/16* (2011.01)
(52) U.S. Cl. .......................................... 127/57
(58) Field of Classification Search .................. None
See application file for complete search history.

(56) References Cited

U.S. PATENT DOCUMENTS

| | | | |
|---|---|---|---|
| 2,156,159 A | 4/1939 | Olson et al. | |
| 2,994,633 A | 8/1961 | Clark | |
| 2,997,466 A | 8/1961 | Ball et al. | |
| 4,409,032 A | 10/1983 | Paszner et al. | |
| 4,470,851 A | 9/1984 | Paszner et al. | |
| 4,520,105 A | 5/1985 | Sinner et al. | |
| 4,645,541 A | 2/1987 | DeLong | |
| 4,742,814 A | 5/1988 | Sinner et al. | |
| 4,764,596 A | 8/1988 | Lora et al. | |
| 2008/0032344 A1* | 2/2008 | Fallavollita | 435/72 |
| 2009/0038212 A1 | 2/2009 | Cooper | |
| 2009/0176286 A1 | 7/2009 | O'Connor et al. | |
| 2010/0269990 A1 | 10/2010 | Dottori et al. | |

FOREIGN PATENT DOCUMENTS

| | | |
|---|---|---|
| CA | 1284637 | 6/1991 |
| GB | 2145090 | 3/1985 |

OTHER PUBLICATIONS

Hosaka, "Filtration of lignin in hydrolysis solution", Hiroshima Daigaku Suichikusangakubu Kiyo, 17(1), 1978, 17-25 (Abstract).
Li et al., "Study on the recovery of lignin from black liquor by ultrafiltration", Huaxue Gongcheng, 31(1), 2003, 49-52 (Abstract).
Marone et al., "Comminution of hydrolytic lignin in a jet mill", Gidroliznaya i Lesokhimicheskaya Promyshlennost, (6), 1991, 14-15 (Abstract).
Shikinaka et al., "Polyfunctional nanometric particles obtained from lignin, a woody biomass resource", Green Chemistry, 12(11), 2010, 1914-1916 (Abstract).
Sokolov et al., "Activation of hydrolytic lignin obtained from corncobs", Kozharska i Obuvna Promishlenost, 13(6), 1972, 13-23 (Abstract).

\* cited by examiner

*Primary Examiner* — Melvin C Mayes
*Assistant Examiner* — Stefanie Cohen
(74) *Attorney, Agent, or Firm* — Kilpatrick Townsend & Stockton LLP

(57) ABSTRACT

Methods are disclosed for providing lignin product of a small particle size for improving burning efficiency and for avoiding typical equipment fouling problems while maximizing energy recovery.

15 Claims, 1 Drawing Sheet

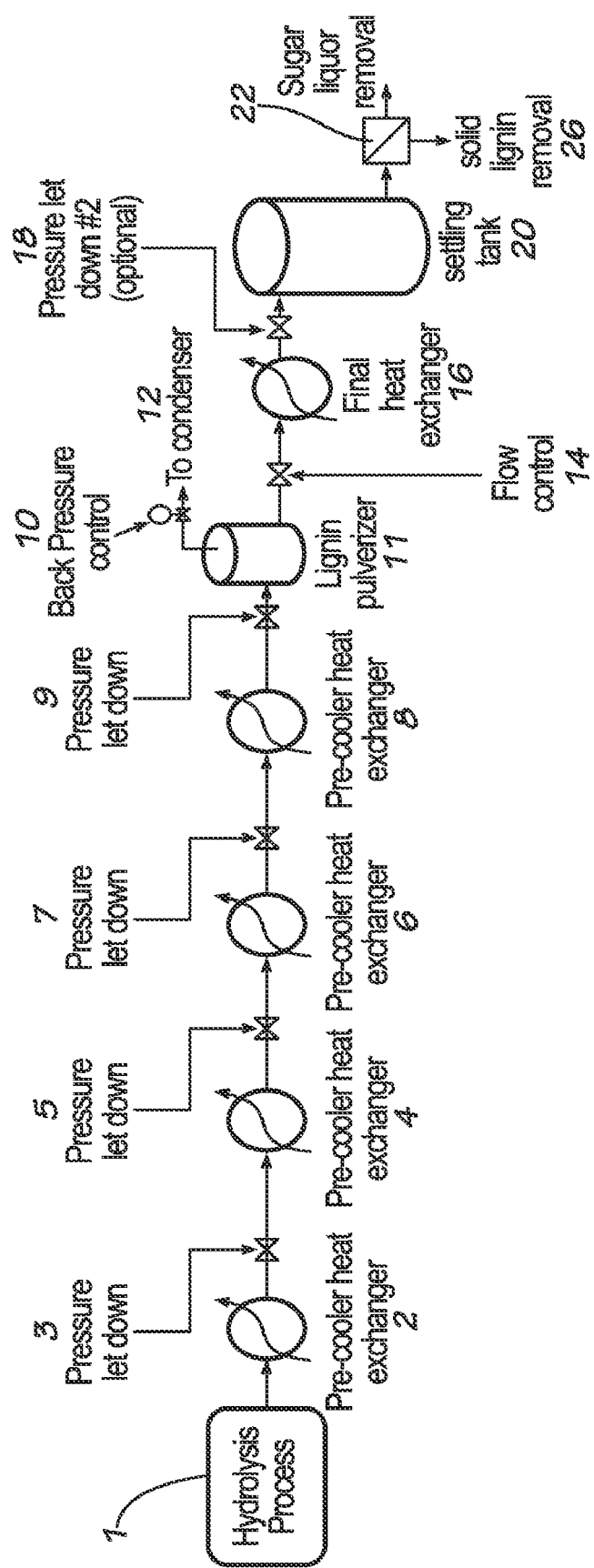

LIGNIN PRODUCTION FROM LIGNOCELLULOSIC BIOMASS

CROSS REFERENCE TO RELATED APPLICATIONS

This applications claims the benefit of U.S. application No. 61/482,425 filed May 4, 2011, the entire disclosure of which is incorporated herein by reference.

FIELD OF THE INVENTION

The present invention generally relates to methods of preparing lignin from lignocellulosic biomass. More particularly, it relates to methods of preparing lignin from lignocellulosic biomass using coordinated reductions in pressure and temperature to separate and to pulverize the lignin without fouling the equipment and with improved energy recovery.

BACKGROUND OF THE INVENTION

Existing processes delignify lignocellulosic biomass before entering the cellulose conversion process using solvents or other chemicals. In such delignification processes, complex equipment is typically required and is expensive to operate because of the solvent or chemical usage and lack of recovery methods. In other existing processes, the solid conversion of lignocellulosic biomass in pre-treatment (fractionation) and cellulose hydrolysis requires high temperatures to fully or partially solubilize the lignin present. Upon cooling, the lignin precipitates from solution. The lignin may be recovered from the process and burned for thermal energy. The particle size of the recovered lignin may be variable and too large for efficient burning, thus requiring a separate pulverizing step. Furthermore, as the lignin in solution cools, it becomes sticky (typically in the glass transition temperature range of lignin, which is about 100° C. under ambient pressure) and tends to foul the process equipment to the point of making the process inoperable. It would be useful to have methods for providing lignin of a substantially uniform, small particle size for improving burning efficiency, for enhanced properties for the use of lignin as a feedstock for the production of other chemicals, and for avoiding typical equipment fouling problems. Furthermore, it would be desirable to maximize energy recovery in the process. The methods and compositions of the present invention are directed toward these, as well as other, important ends.

SUMMARY OF THE INVENTION

In one embodiment, the invention is directed to methods of preparing lignin from lignocellulolosic biomass, comprising:
  providing lignocellulosic biomass under a first pressure of at least about 220 bar and at a first temperature of at least about 360° C., comprising:
    a first solid fraction comprising:
      insoluble lignin; and
    a first liquid fraction comprising:
      soluble $C_6$ saccharides; and
      soluble lignin;
  gradually reducing said first pressure of said lignocellulosic biomass to a second pressure while substantially simultaneously and gradually reducing said first temperature of said lignocellulosic biomass to a second temperature at least about 1° C. above the glass transition temperature of lignin at said second pressure;
  wherein said first liquid fraction is not substantially gasified; and
  optionally, substantially simultaneously reducing said second pressure and said second temperature to a third pressure and a third temperature in a time less than about 1 second to precipitate said soluble lignin in said first liquid fraction and form a mixture comprising:
    a second solid fraction comprising:
      insoluble lignin; and
      precipitated lignin; and
    a second liquid fraction comprising:
      soluble $C_6$ saccharides.

In another embodiment, the invention is directed to methods of reducing lignin fouling during processing of lignocellulosic biomass, comprising:
  providing lignocellulosic biomass under a first pressure of at least about 220 bar and at a first temperature of at least about 360° C., comprising:
    a first solid fraction comprising:
      insoluble lignin; and
    a first liquid fraction comprising:
      soluble $C_6$ saccharides; and
      soluble lignin;
  gradually reducing said first pressure of said lignocellulosic biomass to a second pressure while substantially simultaneously and gradually reducing said first temperature of said lignocellulosic biomass to a second temperature at least about 1° C. above the glass transition temperature of lignin at said second pressure;
  wherein said first liquid fraction is not substantially gasified; and
  optionally, substantially simultaneously reducing said second pressure and said second temperature to a third pressure and a third temperature in a time less than about 1 second to precipitate said soluble lignin in said first liquid fraction and form a mixture comprising:
    a second solid fraction comprising:
      insoluble lignin; and
      precipitated lignin; and
    a second liquid fraction comprising:
      soluble $C_6$ saccharides.

In yet other embodiments, the invention is directed to lignin products produced by the methods of the invention.

In further embodiments, the invention is directed to compositions, comprising:
  lignin;
  wherein said lignin is processed from lignocellulosic biomass using supercritical or near critical fluid extraction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic diagram of the method of producing lignin from cellulosic biomass in one embodiment of the invention.

DETAILED DESCRIPTION OF THE INVENTION

As employed above and throughout the disclosure, the following terms, unless otherwise indicated, shall be understood to have the following meanings.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Also, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

As used herein, the phrase "substantially free" means have no more than about 1%, preferably less than about 0.5%, more preferably, less than about 0.1%, by weight of a component, based on the total weight of any composition containing the component.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near-critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state As used herein, a fluid which is "supercritical" (e.g. supercritical water, supercritical $CO_2$, etc.) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and $CO_2$, etc). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical $CO_2$ may have a temperature of about 250° C. to about 280° C. and a pressure of at least about 225 bar.

As used herein, "continuous" indicates a process which is uninterrupted for its duration, or interrupted, paused or suspended only momentarily relative to the duration of the process. Treatment of biomass is "continuous" when biomass is fed into the apparatus without interruption or without a substantial interruption, or processing of said biomass is not done in a batch process.

As used herein, "resides" indicates the length of time which a given portion or bolus of material is within a reaction zone or reactor vessel. The "residence time," as used herein, including the examples and data, are reported at ambient conditions and are not necessarily actual time elapsed.

As used herein, the term "substantial free of" refers to a composition having less than about 1% by weight, preferably less than about 0.5% by weight, and more preferably less than about 0.1% by weight, based on the total weight of the composition, of the stated material.

As used herein, the term "saccharification" and "saccharified" refers to the breakdown of polysaccharides to smaller polysaccharides, including oligosaccharides, and monosaccharides, whether through hydrolysis, the use of enzymes, or other means, generally into a liquid fraction and a solid fraction.

As used herein, the term "glass transition temperature" or "Tg" means the temperature at which an amorphous regions of a semi-crystalline material change from a glassy, brittle state to a rubbery or plastic state. It is dependent upon the composition of the material being tested, including moisture content, and the extent of annealing. Glass transition temperature may be measured by differential scanning calorimetry, thermomechanical analysis, dynamic mechanical analysis, and the like.

As used herein, the term "pulverize" means providing a small particle size, such as through spraying or atomizing, or reducing the particle size of a given material, whether or not through the use of mechanical means.

As used herein, the term "gradually" or "gradual" used with respect to a pressure or temperature reduction refers to incremental changes of the pressure or temperature, respectively. The incremental changes per unit time may be the same or different. Preferably, an individual increment is less than about 50%, more preferably less than about 25%, even more preferably less than about 20%, yet even more preferably less than about 10%, or even less than about 5% or 1%, of the range to be covered from the initial to final pressure or temperature.

As used herein, the term "simultaneously" or "simultaneous" used with respect to a temperature reduction refers to incremental changes of the temperature that substantially match the corresponding pressure reduction.

As used herein, the term "gasified" or "gasification" means that a material changes from the liquid state to the gaseous state.

As used herein, "lignocellulosic biomass or a component part thereof" refers to plant biomass containing cellulose, hemicellulose, and lignin from a variety of sources, including, without limitation (1) agricultural residues (including corn stover and sugarcane bagasse), (2) dedicated energy crops, (3) wood residues (including sawmill and paper mill discards), and (4) municipal waste, and their constituent parts including without limitation, lignocellulose biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides).

Generally, the methods of the invention utilizes the relationship between glass transition temperature ($T_g$) and pressure to eliminate lignin fouling in the processing equipment while decreasing heat losses. Rather than cooling the slurry as it exits, for example, from the cellulose hydrolysis reactor, the methods of the invention cools the slurry in such a fashion that simultaneous depressurizing and cooling takes places so there is no gasification of the components of the slurry mixture, i.e., no flash cooling at high temperatures. This results in higher heat recovery, using, for example, heat exchangers. As the slurry is gradually depressurized while cooling, the Tg of lignin gradually decreases toward the Tg at atmospheric pressure (i.e., about 100° C.). Thus, the temperature of the slurry is always kept above the $T_g$, thereby preventing fouling and sticking within the processing equipment at higher temperatures. Optionally, the slurry may be subjected to flash cooling from a temperature above the $T_g$ to precipitate out and pulverize (provide as a small particle size) lignin. This is accomplished by cooling the stream containing the lignin to just above its glass transition temperature ($T_g$) to prevent sticking and then rapidly dropping the pressure so that the lignin is well below its $T_g$ at the new pressure when it precipitates out of solution at a small particle size. While this optional step results in some heat loss of low heat, it comes with the advantage of more concentrated product liquor as well as improved lignin quality.

Accordingly, in one embodiment, the invention is directed to methods of preparing lignin from lignocellulolosic biomass, comprising:
   providing lignocellulosic biomass under a first pressure of at least about 220 bar and at a first temperature of at least about 360° C., comprising:
      a first solid fraction comprising:
         insoluble lignin; and
      a first liquid fraction comprising:
         soluble $C_6$ saccharides; and
         soluble lignin;
   gradually reducing said first pressure of said lignocellulosic biomass to a second pressure while substantially simultaneously and gradually reducing said first temperature of said lignocellulosic biomass to a second temperature at least about 1° C. above the glass transition temperature of lignin at said second pressure;
   wherein said first liquid fraction is not substantially gasified; and
   optionally, substantially simultaneously reducing said second pressure and said second temperature to a third pressure and a third temperature in a time less than about 1 second to precipitate said soluble lignin in said first liquid fraction and form a mixture comprising:
      a second solid fraction comprising:
         insoluble lignin; and
         precipitated lignin; and
      a second liquid fraction comprising:
         soluble $C_6$ saccharides.

In another embodiment, the invention is directed to methods of reducing lignin fouling during processing of lignocellulolosic biomass, comprising:
   providing lignocellulosic biomass under a first pressure of at least about 220 bar and at a first temperature of at least about 360° C., comprising:
      a first solid fraction comprising:
         insoluble lignin; and
      a first liquid fraction comprising:
         soluble $C_6$ saccharides; and
         soluble lignin;
   gradually reducing said first pressure of said lignocellulosic biomass to a second pressure while substantially simultaneously and gradually reducing said first temperature of said lignocellulosic biomass to a second temperature at least about 1° C. above the glass transition temperature of lignin at said second pressure;
   wherein said first liquid fraction is not substantially gasified; and
   optionally, substantially simultaneously reducing said second pressure and said second temperature to a third pressure and a third temperature in a time less than about 1 second to precipitate said soluble lignin in said first liquid fraction and form a mixture comprising:
      a second solid fraction comprising:
         insoluble lignin; and
         precipitated lignin; and
      a second liquid fraction comprising:
         soluble $C_6$ saccharides.

A schematic of one embodiment of the invention is shown in FIG. 1. The lignin slurry exits the hydrolysis process 1 at a first temperature and a first pressure. It is first cooled to a first intermediate temperature using a pre-cooler heat exchanger 2 and depressurized to a first intermediate pressure using pressure letdown valve 3. It is next cooled to a second intermediate temperature using a pre-cooler heat exchanger 4 and depressurized to a second intermediate pressure using pressure letdown valve 5. It is further cooled to a third intermediate temperature using a pre-cooler heat exchanger 6 and depressurized to a third intermediate pressure using pressure letdown valve 7. It is further cooled to a fourth intermediate temperature using a pre-cooler heat exchanger 8 and depressurized rapidly using pressure letdown valve 9, and subsequently the liquid (i.e., water) content in the slurry is flash evaporated. This results in the sudden precipitation of the soluble lignin into fine particles inside the lignin pulverizer 11. In certain embodiments, the pulverizer is of relatively small volume to keep the slurry moving and avoid lignin settling. In other embodiments, it may be of a large volume to permit settling of the lignin, which may be recovered by mechanical means, especially when using full flash. The inlet pipe to the pulverizer may either be above, below, or to either side of the pulverizer. Atmospheric pressure for full pressure reduction, or an intermediate pressure in the case of a partial pressure reduction, is maintained in the pulverizer by the back pressure control valve 10. In embodiments using full flash to atmospheric pressure, no back pressure control is needed. Any recovered steam enters a condenser 12 (not shown) for heat recovery. Following the pulverizer, the slurry flows through flow control 14 and then is further cooled to recover more heat in a heat exchanger 16, and is reduced to atmospheric pressure, if not yet a atmospheric temperature, via a pressure letdown valve 18 in the settling tank 20. In the tank, the lignin is permitted to settle to the bottom. Finally, the slurry may be passed through a solid/liquid filtration apparatus 22 for final separation of liquor 24 and lignin 26.

Advantages of the methods of the invention are that the pulverization (preparation of small particles and/or reduction in average particle size) of soluble and insoluble lignin improves handling, accelerates the drying, and improves combustion of the lignin. Another advantage of the methods of the invention is that the glass transition phase of the lignin, both soluble and insoluble, is avoided, which in turn avoids fouling of the process equipment.

In certain embodiments of the method, lignocellulosic biomass is fractionated to remove at least a portion of $C_5$ saccharides by any suitable means, including, but not limited to, hydrothermal treatment (such as hot compressed water, subcritical, near critical, or supercritical water, which may contain other fluids, including alcohol, acid, or base), enzymatic treatment, and the like.

In certain embodiments of the method, the average particle size of said insoluble lignin and precipitated lignin is less than about 500 microns.

The methods of the invention are preferably run continuously, although they may be run as batch or semi-batch processes.

The methods of the invention may be carried out in any suitable reactor, including, but not limited to, a tubular reactor, a digester (vertical, horizontal, or inclined), and the like. Suitable digesters include the digester system described in U.S. Pat. No. 8,057,639, which include a digester and a steam explosion unit, the entire disclosure of which is incorporated by reference.

In certain embodiments, methods employ multiple pressure down valves and multiple heat exchangers.

In certain embodiments of the methods, the first temperature is about 360° C. to about 380° C., preferably, about 360° C. to about 377° C., and more preferably, about 365° C. to about 377° C.

In certain embodiments of the methods, the second temperature is at least about 5° C. above the glass transition temperature of lignin at said second pressure. In certain embodiments of the methods, the second temperature is at least about 10° C. above the glass transition temperature of lignin at said second pressure. In certain embodiments of the methods, the second temperature is about 110° C. to about 150° C., preferably, about 110° C. to about 135° C., and more preferably, about 110° C. to about 120° C.

In certain embodiments of the methods, the third temperature is about 20° C. to about 100° C., preferably, about 20° C. to about 80° C., and more preferably, about 20° C. to about 60° C.

In certain embodiments of the methods, the first pressure is about 220 bar to about 300 bar, preferably, about 220 bar to about 250 bar, and more preferably, about 240 bar to about 250 bar.

In certain embodiments of the methods, the second pressure is greater than atmospheric pressure. In certain embodiments of the methods, the second pressure is about 50 bar to about 150 bar, preferably, about 50 bar to about 125 bar, and more preferably, about 50 bar to about 100 bar. In certain embodiments of the methods, the second pressure is atmospheric pressure.

In certain embodiments, the methods may further comprise the step of recovering at least a portion of heat added to the system, for example, through the use of at least one heat exchanger.

In certain embodiments, the method further comprises the step of reducing the pressure on said mixture to a third pressure. Pressure control impacts temperature in the flashing process where the saccharified lignocellulosic biomass is cooled in a very short period of time (e.g., less than one second). The inlet pressure must be equal to or greater than the saturation pressure at the given temperature so that the liquid components of fraction remain as liquids. With respect to processing of lignocellulosic biomass, it is preferably to avoid the temperature range of about 180° C. and about 240° C., the glass transition temperature range of lignin under typical processing conditions. Thus, if the inlet temperature is at least the 240° C.+1° C., then the minimum inlet pressure needs to be about 34 bar but may be much higher. For example, it is typical to have the inlet pressure at 40 bar. The exit temperature is determined and dependent upon the exit pressure. If, for example, there is flash cooling of the saccharified lignocellulosic biomass down to a temperature of 180° C., then the exit pressure needs to equal to the saturation pressure at 180° C., which about 10 bar. The exit pressure is controlled by the back pressure valve, and the exit temperature is determined by the exit pressure. If the exit pressure is changed, the exit temperature will also change. The exit temperature is the saturation temperature at the selected pressure.

In certain embodiments, the method further comprises the step of permitting said insoluble lignin and said precipitated lignin, where the lignin has been pulverized (provided as a small particle size or reduce the particle size) to separate out by gravity.

In certain embodiments, the method further comprises the step of separating said second solid fraction and said second liquid fraction. Suitable separation methods including filtration methods well known to those skilled in the art, such decanter filters, filter press, reverse osmosis and nanofiltration, centrifuge decanters, and the like.

In another embodiment, the invention is directed to lignin products produced by the methods of the invention, including fuels, such as those used in a process heat boiler. The lignin product may also be used as a functional replacement for phenol, as a functional replacement for polyol, or as a building block for carbon fiber. In certain embodiments, the lignin product is used as a fuel, tackifier, phenol formaldehyde resin extender in the manufacture of particle board and plywood, in the manufacture of molding compounds, urethane and epoxy resins, antioxidants, controlled-release agents, flow control agents, cement/concrete mixing, plasterboard production, oil drilling, general dispersion, tanning leather, road covering, vanillin production, dimethyl sulfide and dimethyl sulfoxide production, phenol substitute in phenolic resins incorporation into polyolefin blends, aromatic (phenol) monomers, additional miscellaneous monomers, carbon fibers, metal sequestration in solutions, basis of gel formation, polyurethane copolymer, and combinations thereof.

In another embodiment, the invention is directed to compositions, comprising:
   lignin;
   wherein said lignin is processed from lignocellulosic biomass using supercritical or near critical fluid extraction.
In preferred embodiments, the composition is substantially free of organic solvent. In preferred embodiments, the lignin has an average particle size less than about 500 microns, more preferably 300 microns, even more preferably, less than about 250 microns, and yet even more preferably less than about 50 microns. The particle size of the lignin may be measured by standard sieve shaker, microscopy, infrared spectroscopy, and other standard size analysis techniques.

In a preferred embodiment, the lignin has a heating value as measured by ASTM-D240 of at least about 5,000 BTU/lb at 30% moisture content. In a preferred embodiment, the lignin has a heating value as measured by ASTM-D240 of at least about 7,500 BTU/lb at 15% moisture content. In a preferred embodiment, the lignin has a heating value as measured by ASTM-D240 of at least about 8,000 BTU/lb at 5% moisture content.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

The methods of the invention may be carried out using the following pressure and temperature changes using the apparatus shown in FIG. 1:

| | Temperature (° C.) | Pressure (bar) |
|---|---|---|
| Starting Point | ≧~365 | ≧~250 |
| 1. From starting pressure, reduce temperature to about 250° C. and then reduce pressure to 150 bar | ≧~365 → ~250 | ≧~250 → ~150 |
| 2. Reduce temperature to about 210° C. and then reduce pressure to 50 bar | ~250 → ~210 | ~150 → ~50 |
| 3. Reduce temperature to about 145° C. and then reduce pressure to 20 bar | ~210 → ~145 | 50 → 20 |
| 4. Reduce temperature to about 120° C. and then flashed off | ~145 → ~120 | 20 → atmospheric |

Conventional processes suffer a major disadvantage because of the heat loss due to flashing that reduces heat recovery. In contrast, the methods of the present invention cool and depressurize simultaneously so that there is no flashing. In other words, all the heat put into the system may be recovered as there is no steam formation. Even if there is some flashing, it would be very minimal with little heat loss. Accordingly, the method of the present invention reduces heat loss through the system.

When ranges are used herein for physical properties, such as molecular weight, or chemical properties, such as chemical formulae, all combinations, and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method of reducing lignin fouling during processing of lignocellulolosic biomass, comprising:
providing lignocellulosic biomass under a first pressure of at least about 220 bar and at a first temperature of at least about 360° C., comprising:
a first solid fraction comprising:
insoluble lignin; and
a first liquid fraction comprising:
soluble $C_6$ saccharides; and
soluble lignin;
gradually reducing said first pressure of said lignocellulosic biomass to a second pressure while substantially simultaneously and gradually reducing said first temperature of said lignocellulosic biomass to a second temperature at least about 1° C. above the glass transition temperature of lignin at said second pressure;
wherein said first liquid fraction is not substantially gasified; and
optionally, substantially simultaneously reducing said second pressure and said second temperature to a third pressure and a third temperature in a time less than about 1 second to precipitate said soluble lignin in said first liquid fraction and form a mixture comprising:
a second solid fraction comprising:
insoluble lignin; and
precipitated lignin; and
a second liquid fraction comprising:
soluble $C_6$ saccharides.

2. A method of claim 1,
wherein said first temperature is about 360° C. to about 380° C.

3. A method of claim 1,
wherein said second temperature is at least about 5° C. above the glass transition temperature of lignin at said second pressure.

4. A method of claim 1,
wherein said second temperature is about 110° C. to about 120° C.

5. A method of claim 1,
wherein said third temperature is about 20° C. to about 100° C.

6. A method of claim 1,
wherein said first pressure is about 220 bar to about 250 bar.

7. A method of claim 1,
wherein said second pressure is greater than atmospheric pressure.

8. A method of claim 1,
wherein said second pressure is about 50 bar to about 150 bar.

9. A method of claim 1,
wherein said second pressure is atmospheric pressure.

10. A method of claim 1, further comprising:
recovering at least a portion of heat.

11. A method of claim 1, further comprising:
permitting said insoluble lignin and said precipitated lignin to separate out by gravity.

12. A method of claim 1,
wherein said method is continuous.

13. A method of claim 1,
wherein said method employs multiple pressure down valves and multiple heat exchangers.

14. A method of claim 1,
wherein said lignocellulosic biomass is fractionated to remove at least a portion of $C_5$ saccharides prior to said providing step.

15. A method of claim 1,
wherein the average particle size of said insoluble lignin and precipitated lignin is less than about 500 microns.

* * * * *

UNITED STATES PATENT AND TRADEMARK OFFICE
CERTIFICATE OF CORRECTION

| | |
|---|---|
| PATENT NO. | : 8,317,928 B1 |
| APPLICATION NO. | : 13/464453 |
| DATED | : November 27, 2012 |
| INVENTOR(S) | : Krishnan V. Iyer, Michel A. Simard and Kiran Kadam |

It is certified that error appears in the above-identified patent and that said Letters Patent is hereby corrected as shown below:

Title page, item (75); the first named inventor "Krishan V. Iyer" should read --Krishnan V. Iyer--.

Signed and Sealed this
Nineteenth Day of March, 2013

Teresa Stanek Rea
*Acting Director of the United States Patent and Trademark Office*